Figure 1:
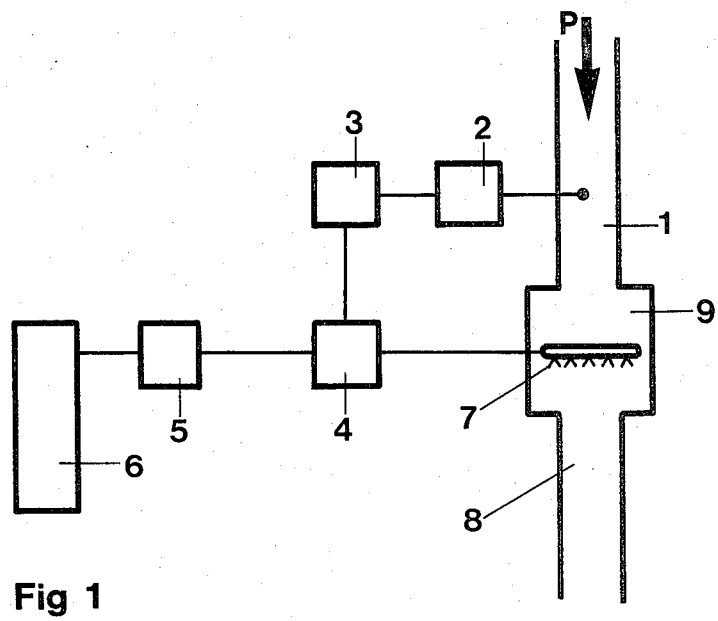

United States Patent [19]

Wendelin et al.

[11] 4,240,798

[45] Dec. 23, 1980

[54] METHOD AND APPARATUS FOR REDUCING OZONE

[75] Inventors: Rurik Wendelin, Järfälla; Ladislav Sipek, Täby, both of Sweden

[73] Assignee: AGA Aktiebolag, Lindingo, Sweden

[21] Appl. No.: 54,887

[22] Filed: Jul. 5, 1979

[51] Int. Cl.$^3$ .................. G01N 27/62; G01N 27/00; G05D 7/00
[52] U.S. Cl. .................. 23/230 A; 23/232 R; 422/83; 422/111; 422/123; 98/1.5; 422/62; 422/117; 423/219; 423/210
[58] Field of Search ............... 422/105, 108, 110, 111, 422/114, 117, 120, 123, 124, 83, 98, 119, 62, 63, 3, 4; 423/210 R, 210 S, 581, 405, 219; 98/1.5; 173/23, 26; 23/230 A, 232 R, 232 E

[56] References Cited

U.S. PATENT DOCUMENTS

| | | | |
|---|---|---|---|
| 2,056,663 | 10/1936 | Foulke | 422/122 |
| 3,151,943 | 10/1964 | Fujimoto et al. | 423/210 S |
| 3,242,058 | 3/1966 | Ganley et al. | 98/1.5 |
| 3,854,882 | 12/1974 | Washburn | 422/111 |
| 3,871,831 | 3/1975 | Ardral et al. | 422/111 |
| 3,973,914 | 8/1976 | van Heusden | 423/405 |
| 4,168,295 | 9/1979 | Sawyer | 422/111 |

OTHER PUBLICATIONS

ICAS Proceedings 1978, issued 10-16 Sep., 1978, pp. 207-216.
Chemical Abstracts, vol. 84, 1976, abstract No. 49505s, Osechkin, V. V., "Estimation of Possible Ozone Concentration in the Cabins of Supersonic Transport Planes under Different Flight Conditions".
Chemical Abstracts, vol. 84, 1976, abstract No. 347911, Osechkin, V. V., "Use of a Chemical Method to Study the Ozone Content in Cabins of Jet Airplanes".
Chemical Abstracts, vol. 84, 1976, abstract No. 64830n, Ichikawa, K. et al, "The Removal of Ozone from Waste Gases".
Chemical Abstracts, vol. 79, 1973, abstract No. 3478y, Bischof, W., "Ozone Measurements in Jet Airliner Cabin Air".

Primary Examiner—William F. Smith
Assistant Examiner—Chris Konkol
Attorney, Agent, or Firm—Larson, Taylor and Hinds

[57] ABSTRACT

In the decomposition of ozone in aircraft, the ozone level in an airflow upstream of the aircraft cabin is measured and a signal generated in accordance with the sensed level. This signal is amplified to a given value and a valve is opened or closed in response thereto. Connected to the valve is a source of nitric oxide under pressure. When the valve is opened a measured quantity of nitric oxide is dispensed to a location in said airflow remote from said ozone monitoring device.

6 Claims, 2 Drawing Figures

METHOD AND APPARATUS FOR REDUCING OZONE

The present invention relates to a method and an apparatus for eliminating or reducing ozone in atmospheric air or in air which is passed to environments in which hygienic or material disadvantages occur, there being charged to said air concentrated NO or NO mixed with $N_2$ or A, the $N_2$ or A being a carrier gas.

When using light-arcs, ozone is formed in the air surrounding the arcs. Ozone is formed by the irradiation of atmospheric oxygen with ultraviolet radiation at wave-lengths below 250 nm. Among light-arcs which produce radiation with this wave-length range are those used for such purposes as lighting, welding, cutting, metalworking and smelting. Light-arcs used for illuminating purposes are normally in a housing, in which the arc burns in a compressed inert gas. Other types of light-arcs normally burn in a free atmosphere, UV-radiation with wave lengths shorter than 250 nm is also produced in low-pressure discharge lamps and certain types of halogen lamps. The result of this radiation is the formation of ozone around these light sources. Ozone is also formed in the vicinity of electrical apparatus in which powerful sparking occurs. The spark also constitutes a source of UV-light, resulting in the formation of ozone.

In addition to the aforementioned photochemical reaction between oxygen and ultraviolet radiation, ozone can also be formed by a corona discharge; impacts between oxygen atoms and electrons lead to the formation of ozone. Such undesirable discharges occur in high-voltage systems. They can also be purposely created to produce water-ozonization in industrial ozone generators.

When the aforementioned apparatus and systems are in continuous operation in an enclosed space, a high concentration of ozone is gradually built up. This can result in hygienic and material drawbacks, if satisfactory ventilation cannot be provided. The ventilation air, however, may contain ozone and therewith create problems. One example in this respect is the passenger accommodation of an aeroplane, to which air is supplied from the surrounding atmosphere.

At heights now flown by modern aircraft, aircraft often pass through layers or pockets of air containing ozone, introducing a harmful atmosphere to the passengers and crew. In order to avoid this, present day measures require the flying height to be lessened by roughly 1000 meters. Such a measure is time-consuming, however, and when air traffic is dense creates a hazard.

The ozone concentration in the cabins of aircraft is described in some detail in, interalia, NASA Technical Paper No. 1340, published 1978. A further publication discussing ozone concentrations in aircraft is "The measurement of ozone in aircraft" by S. van Heusden and L. G. J. Mans, Philips Techn. Rev. 38 131-134, 1978/1979 No. 4/5. The problem of ozone in aircraft and proposed solutions thereto is also described in ICAS Proceedings 1978 issued 10-16 September 1978.

In accordance with one known solution of reducing the concentration of ozone there is placed in the air stream a filter comprising manganese-oxide and copper-oxide (a so-called Hopcalite filter). This filter, however, must be changed at regular intervals, which is both time consuming and expensive. Further, the filter is heavy and thus reduces the payload. The filter also consumes a relatively large amount of energy, due to flow resistance.

In a further attempt to solve the above-mentioned problem, the Hopcalite filter was replaced by a carbon filter. This filter, however, has all the disadvantages of the Hopcalite filter and is, in addition, inflammable and electrically conductive, this latter property rendering it possible for the filter to influence instrument readings.

Ozone concentrations can also be reduced by heating the incoming air to high temperatures, to decompose $O_3$ to $O_2+O$, whereafter the air is cooled to a suitable temperature, before being passed to the aircraft cabin. Large amount of energy are required when practising this method, however, rendering it unfavourable from the aspect of economy.

An object of the invention is to provide a method and apparatus by which ozone concentrations in aircraft can be effectively reduced in a ready and simple manner.

This object is realized by means of the invention, which comprises measuring the level of ozone in an air stream prior to discharging the air into the cabin of the aircraft. To this end there is used an ozone analyzer, such as a C.S.I ozone monitor, which is arranged to transmit a signal to a signal amplifier, the magnitude of said signal being dependent upon the level of ozone measured. The signal is modified in the amplifier in accordance with a preset programme, and the modified signals transmitted to a valve means co-acting with a further valve for dispensing nitric oxide into the air stream, said further valve having the form of a fixed orifice for example. The amplifier is of conventional design, and may be arranged to cooperate with logic means, such as a quantizer, whereby the output signal has characteristics dependent upon the sensed ozone level, and the valve, which may be a conventional needle valve, is opened (or closed) to an extent such as to permit the required amount of nitric oxide to be dispensed into said air stream.

It will be noted that when ozone ($O_3$) reacts with nitric oxide (NO), nitrogen dioxide ($NO_2$) is formed, which is in itself a pollutant. However, whilst the International Limit Value for ozone is as low as from 0.05 to 0.1 ppm the corresponding limit value for nitrogen dioxide is 5 ppm i.e. 50 times higher than for $O_3$, or in other words nitrogen dioxide is 50 times less harmful than equal quantities of ozone. At those heights normally flown by present day aircraft, the level of ozone in the different cruising altitudes can vary between 0.5-2.4 ppm. These levels are 5 to 25 times the permitted limit. When decomposing this ozone in accordance with the invention, equal quantities of $NO_2$ will be formed, plus oxygen, which is harmless. The concentration of nitrogen dioxide is thus 100 to 20 times lower than that permitted in breathing air.

The nitric oxide is dispensed to the air stream either in its pure form or mixed with nitrogen or argon, the nitrogen or argon being a carrier gas.

The method will now be described in more detail with reference to an apparatus for carrying out the method.

Figure 2:
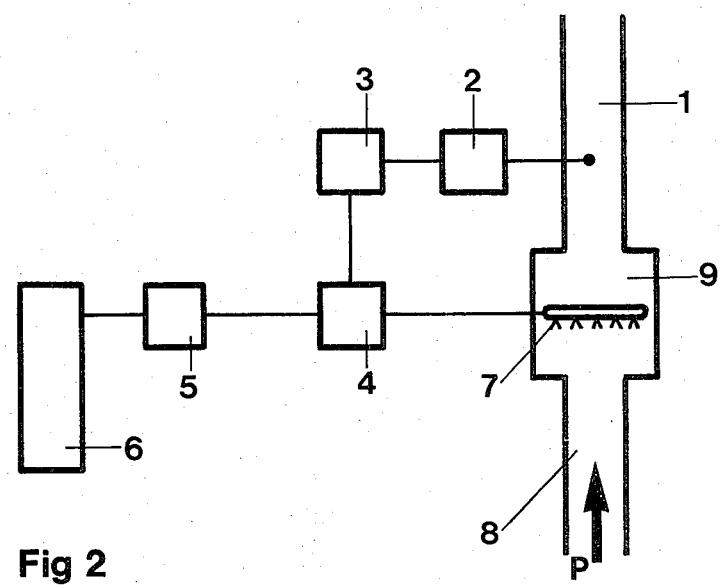

In the accompanying schematic drawing, FIG. 1 illustrates an apparatus in which the level of ozone is measured at one location in the air stream, and FIG. 2 illustrates an apparatus in which the level of ozone is measured at another location in said air stream.

In FIG. 1 the references 1 and 8 identify lines through which air is passed from an inlet to the cabin of an aircraft, the direction of flow of said air being shown by the arrow P. Incorporated in the line 1 is an ozone monitoring device 2, such as a C.S.I monitor for example. In the simplest form of the apparatus according to the invention, the device is arranged to transmit to an amplifier 3 of conventional design a signal representation of the level of ozone measured in the air stream. The signal is amplified to a given value in the amplifier 3 and transmitted to a valve means 4, which is arranged to be opened or closed in dependence upon the value of the signal transmitted thereto.

The valve 4, which may be of any suitable design, such as a needle valve for gases, is connected to a safety valve means 5, for example in the form of an orifice of fixed throughput, through which nitric oxide, optionally in mixture with a carrier gas, such as nitrogen or argon, is fed from a gas-container 6, through the valve 4, to a spray means 7 located in a space 9 in the air lines 1 and 8 at a distance downstream of the ozone monitor 2. The monitor 2 can be set so that a zero signal is transmitted to the amplifier 3 when the level of ozone sensed is below a given value, for example 0.05 ppm. In the FIG. 1 embodiment of the invention, the amount of nitric oxide fed to the spray means 7 will always be the same irrespective of the level of ozone detected, i.e. a predetermined amount for which the valve 4 is dimensioned. The safety valve 5 is dimensioned to permit only this maximum flow to the valve 4, so that if for some reason, the valve 4 should malfunction such as to permit excessively large amounts of NO to be fed from the container to the space 9, e.g. amounts harmful to the passengers, the amount of NO, which can be fed to the valve 4, will always to that for which the valve 4 is dimensioned.

If it is required to regulate the flow of ozone in accordance with prevailing levels of ozone, the apparatus according to FIG. 2 may be used.

This apparatus comprises the same elements 2 to 7 as the FIG. 1 embodiment, although in this case the ozone-monitoring device 2 is place downstream of the spray means 7 and is arranged to monitor residual quantities of ozone in the flow of air having passed the space 9. Amplification of the signals received by the amplifier 3 is dependent upon the levels of ozone detected, and the valve 4 is opened or closed progressively in dependence upon the value of respective signals. Thus, initially the valve is fully closed, so that no nitric oxide is fed to the space 9. When the monitor 2 senses the presence of ozone above a given limit, the signal will be greatly amplified such as to cause the the valve 4 to be fully opened. As the level of ozone progressively decreases, subsequent to the introduction of NO to the space 9, amplification of the signals from the monitor 2 is decreased to a corresponding extent, causing the valve 4 to be progressively closed so that the amount of NO dispensed to the space is commensurate with that required to reduce the sensed level of ozone. In this embodiment the amplifier 3 may be connected to a quantizier (not shown) having a plurality of outputs of different signal levels.

We claim:

1. A method of decomposing ozone in aircraft, comprising
   (a) measuring by means of an ozone-monitoring device the level of ozone at a first location upstream of a second location in a flow of air passing to the cabin of said aircraft;
   (b) transmitting a signal from said monitoring device to an amplifier when the level of ozone in said first location is above a first limit level;
   (c) amplifying said signal to a given value;
   (d) transmitting said amplified signal to a valve means arranged to open in reference to said amplified signal, and
   (e) feeding nitric oxide through said valve means to said second location in said air-flow.

2. A method of controlling ozone-concentrations in aircraft, comprising
   (a) measuring by means of an ozone-monitoring device the level of ozone in an air flow at a first location therein downstream of a second location therein, said monitoring device being arranged to generate signals of given values in dependence upon the various levels of ozone measured by said device above a given level;
   (b) transmitting said signal to an amplifier;
   (c) amplifying said signal to a value corresponding to the value of the signal received from the monitor;
   (d) transmitting said modified signal to a valve means whose through-put is regulated by signals of respective values, and
   (e) feeding nitric oxide through said valve means to said second location in said air-flow.

3. An apparatus for decomposing ozone in aircraft, comprising an ozone monitoring means arranged in a flow of air of the cabin of said aircraft and adapted to generate a signal when the level of ozone monitored is above a given level;
   an amplifier connected to said ozone monitoring means and arranged to amplify said signal to a given value; valve means arranged to be opened and closed in response to the value of said signal;
   container means containing nitric oxide connected to said valve; and dispensing means for dispensing nitric oxide to a location upstream of said monitoring means.

4. An apparatus according to claim 3, wherein a safety valve means having a fixed throughput is arranged between said valve means and said container means containing nitric oxide.

5. An apparatus for decomposing ozone in aircraft, comprising an ozone monitoring device arranged in a flow of air to the cabin of said aircraft and adapted to generate signals of different levels in response to the ozone levels detected in said airflow above a given level;
   amplifying means arranged to amplify respective signals to respective levels of given magnitudes; valve means arranged to be regulated progressively by the respective amplified signals;
   container means containing nitric oxide connected to said valve means; a gas dispensing means arranged to dispense said nitric oxide to a location downstream of said ozone monitoring device in quantities corresponding to the level of the signals sent to said amplifier.

6. An apparatus according to claim 5, wherein a safety valve means is arranged between said valve means and said container means containing nitric oxide, said safety valve having a fixed throughput corresponding to the maximum intended throughput of said valve means.

* * * * *